United States Patent [19]

Dowgul et al.

[11] 4,350,662
[45] Sep. 21, 1982

[54] CARBON DIOXIDE ABSORBENT CANISTER WITH BREATHING GAS TEMPERATURE AND FLOW CONTROL

[75] Inventors: Ronald W. Dowgul; Glendle W. Noble, both of Panama City Beach, Fla.

[73] Assignee: The United States of America as represented by the Secretary of the Navy, Washington, D.C.

[21] Appl. No.: 227,285

[22] Filed: Jan. 22, 1981

[51] Int. Cl.[3] .................. A62B 7/10; A61M 15/00; B01D 53/14

[52] U.S. Cl. .................................. 422/122; 55/269; 55/387; 55/DIG. 33; 128/204.15; 128/204.17; 128/205.12; 128/205.28; 422/120; 422/200

[58] Field of Search .................. 422/120, 122, 4, 173, 422/188, 200, 205; 128/204.15, 204.17, 205.12, 205.28; 55/80, 269, 387, DIG. 33

[56] References Cited

U.S. PATENT DOCUMENTS

| | | | |
|---|---|---|---|
| 2,517,209 | 8/1950 | Jackson et al. | 422/120 |
| 2,847,284 | 8/1958 | Busey | 422/205 |
| 2,848,309 | 8/1958 | Hay | 422/120 |
| 2,889,210 | 6/1959 | Bovard | 422/120 |
| 3,127,247 | 3/1964 | Davis | 422/188 |
| 3,311,456 | 3/1967 | Denny et al. | 422/173 |
| 3,508,882 | 4/1970 | Parnell | 422/205 X |
| 3,612,048 | 10/1971 | Takaoka | 128/205.28 X |
| 3,710,553 | 1/1973 | Parker | 55/316 |
| 3,773,044 | 11/1973 | Wallace | 422/122 X |
| 3,898,978 | 8/1975 | Marcus | 128/204.17 X |
| 4,029,483 | 6/1977 | Long | 55/68 |
| 4,193,966 | 3/1980 | Dowgul | 422/122 |

*Primary Examiner*—Barry S. Richman
*Attorney, Agent, or Firm*—Richard S. Sciascia; Harvey A. David

[57] ABSTRACT

A carbon dioxide scrubber device for use in a closed or semi-closed breathing gas circuit in an underwater breathing apparatus having a low rate of gas flow includes a canister having a plurality of spaced, coaxial walls that are heated by associated helical water flow heat exchangers and define axial gas flow chambers in which particulate carbon dioxide absorbent material is confined in contact with the heated walls. The heat exchangers are served by common supply and drain lines through water flow controlling connectors having flow dividing and uniting orifices.

2 Claims, 3 Drawing Figures

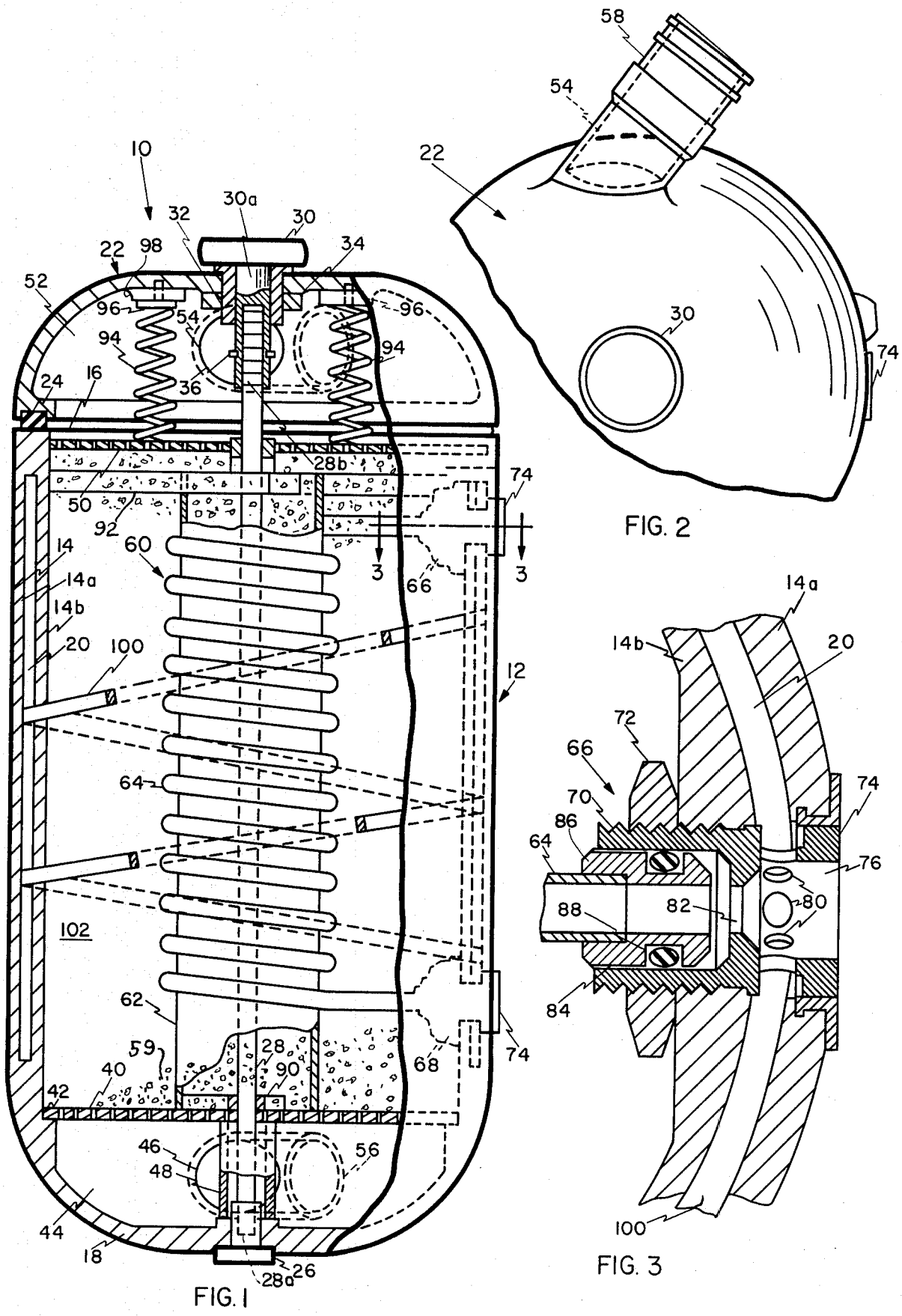

CARBON DIOXIDE ABSORBENT CANISTER WITH BREATHING GAS TEMPERATURE AND FLOW CONTROL

BACKGROUND OF THE INVENTION

This invention relates to underwater breathing apparatus of the type wherein breathing gas is recirculated through a canister containing a carbon dioxide absorbent, and more particularly to an improved carbon dioxide absorbent canister that provides temperature and flow control of the breathing gas.

One form of diving equipment suitable for complete life support of saturation divers operating for extended work periods in very cold and deep water is of the semi-closed, mixed gas type that receives make-up gas and hot water for a heated diving suit through an umbilical by which the diver is tethered to a support facility such as an underwater vehicle.

During normal semi-closed circuit operation, breathing gas from the umbilical passes through an absolute pressure regulator into an inhalation bag, and then through a hose connection to an oronasal face mask. Exhaled gas passes from the mask via a hose to an exhalation bag. From the exhalation bag, most of the exhaled gas flows through a carbon dioxide removal canister to the inhalation bag where it is enriched in oxygen by being mixed with the incoming make-up gas from the umbilical, and subsequently rebreathed. A portion of the exhaled gas does not flow through the canister but is exhausted through an exhaust valve to the water to allow for the make-up gas. In this system, the circulation of the gases is effected almost entirely by the pulmonary efforts of the diver himself. The flow rate through the carbon dioxide scrubber or absorbent canister is usually on the order of one cubic foot per minute, or less, with sinusoidal breathing fluctuations being substantially damped out by the breathing bags. Thus, the gas is subjected to a relatively long and constant residence time in the canister as compared to systems using pumping means such as an aspirator to promote the gas circulation. In the latter systems the gas flow rate through a scrubber canister will generally be on the order of ten to twenty cubic feet per minute.

The latter, flow assisted systems, wherein the high flow rate and short residence times have caused a drying effect on the absorbent material that adversely affects the desired carbon dioxide removing, exothermic reaction, have benefited from the improved carbon dioxide absorbent canister described in U.S. Pat. No. 4,193,966, assigned to the assignee, hereof. That canister has a condensate control feature that avoids the drying action and materially lengthens the effective life of a canister charge in the high flow rate system by extracting heat from the moisture laden incoming breathing gas so as to drop sufficient moisture in the absorbent bed to maintain the reaction.

In cold water operations it has been found that the systems relying principally upon pulmonary function to circulate the gas and having a relatively long residence time of the gas in the scrubber canister are not subject to the same absorbent drying problem, but rather to such severe loss of heat to the cold environment that the operation and effective life of the absorbent charge in the canister is much shorter than would be expected from the calculated life expectancy of the charge. Examinations of the used canister charge have usually shown that only a small portion was chemically spent and efforts have been made to counter this by providing insulation or a heated water jacket around the canister and by adding lateral mechanical baffles to force increased contact area between gas and absorbent and avoid "channeling" of the gas along the wall surfaces of the canister, another presumed cause of short effective scrubbing duration, all with dissappointing results.

SUMMARY OF THE INVENTION

With the foregoing in mind it is a principal object of this invention to provide an improved carbon dioxide scrubber or absorbent canister suitable for prolonged use in closed or semi-closed underwater breathing apparatus systems having a relatively low gas flow rate through the canister.

Another, and important object of the invention is to provide such an improved carbon dioxide absorbent canister that occupies the same volume as the canister it replaces while yielding much more complete usage of the absorbent charge capability, and hence a materially longer effective life for a given charge.

Yet another object of this invention is the provision of a canister of the foregoing character that is rugged of construction, reliable in operation, and is easier to empty and recharge with absorbent material than those canisters having complex baffles and/or reentrant walls that make it difficult to avoid voids in the bed.

As still another object, the invention aims to accomplish the foregoing in part by taking advantage of what had heretofore been considered an undesirable condition of allowing along the wall flow of gas together with certain novel constructions, combinations, and arrangements of parts.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 1 is a side view partly in elevation and partly in section of a carbon dioxide scrubbing absorbent canister device embodying the invention;

FIG. 2 is a fragmentary top view of the device of FIG. 1; and

FIG. 3 is a fragmentary sectional view, on an enlarged scale, illustrating a portion of the device of FIG. 1 as seen substantially along line 3—3 thereof.

DESCRIPTION OF THE PREFERRED EMBODIMENT

In the form of the invention illustrated in the drawings and described hereinafter, an improved carbon dioxide absorbing canister device, indicated generally at 10, comprises a hollow canister body 12 that has a generally cylindrical mid section 14 that presents an annular seat 16 at one end and is closed at the other end by a substantially hemispherical end wall 18. The body 12 is preferably formed of a rigid material such as glass fiber reinforced polyester or epoxy plastic. As is illustrated in FIG. 1, the mid section 14 is characterized by spaced outer and inner walls 14a and 14b defining a heating water jacket space 20, the purpose of which will later be discussed more fully.

A hemispherical closure member or cover 22 is provided for closing the open end of the canister body 12 and carries an annular rubber gasket 24 that sealingly engages the annular seat 16. The hemispherical end wall 18 is provided with an internally threaded anchor member 26 fixed centrally therein. The anchor member 26 receives the threaded end 28a of an axially extending rod 28 that projects into the interior of the cover member 22 and terminates in a threaded end 28b.

A suitably knurled nut member 30 has an internally threaded sleeve portion 30a extending centrally through the closure member 22 and threadedly engages the end 28b of rod 28. The nut member 30 is axially slidable in a bushing 32 secured in the closure member by a nut 34. A retainer ring 36, engaged in a groove in the nut member sleeve portion 30a, conveniently precludes separation of the nut member from the closure member.

A perforated disc or screen 40 rests against an annular ledge 42 in end of the body 12 closed by the end wall 18 and defines an air chamber 44 that is served by a passage 46 for entry or exit of breathing gas, depending upon orientation of the device 10 in a diving system. A boss or cylindrical spacer 48 further serves to support the screen 40 in its more central area.

A similar perforated disc or screen 50 is disposed within the body 12 adjacent the closure member 22 and defines, between the screen and that closure member, a chamber 52 served by a passage 54. The passages 46 and 54 lead through suitable nipples 56 and 58, respectively, for connection of the device 10 into a breathing circuit.

It will be understood that the perforated discs or screens 40 and 50 have central apertures that pass the rod 28 and serve to confine therebetween a body of particulate, carbon dioxide absorbing material, shown in part at 59. Also disposed between the screens 40 and 50 is a hollow heat exchanger column 60 comprising a thin wall tube 62, having a diameter on the order of about one third the inside diameter of the inner wall 14b of the canister body 12. The heat exchanger column further comprises a helical, heating water tube 64 coiled about the outer surface of the cylinder 62 and having its opposite ends extending radially and connected, by fittings 66 and 68, through the walls 14a, 14b for introduction and removal of heating water.

Referring to FIG. 3, the fitting 66 comprises a bushing 70 fixed in the inner and outer walls by an external threads and a suitable nut 72. The bushing 70 presents an outer annular face or seat 74 surrounding an inlet passage 76 and adapted to be pressed against a gasketed, heated water supply fitting (not shown). The bushing 70 is provided with a plurality of lateral openings 80 communicating with the water jacket space 20, and also with an orifice 82 communicating with a bore 84. A tube end member 86 is fixed to the end of tube 64, as by soldering, and has a groove in which an O-ring 88 is deposited. The O-ring cooperates with the bore 84 of the fitting to seal the end of pipe 64 relative to the bushing 70.

The heat exchanger column 60 is conveniently formed of a suitable metal, the tube 64 being soldered or otherwise fixed to the outer surface of the cylindrical column wall or tube 62, and to the tube end members 86.

When heated water is forced into the passage 76, a portion thereof divides and flows through openings 80 into the space 20, while the remainder flows through the orifice 82 into the tube 64. The fitting 68 is identical in structure and so need not be described again. Suffice it to say that water may enter the device at either of the fittings 66, 68 and exit at the other. At the exiting fitting, it will be understood that water passing from the tube 64 through orifice 82 into passage 76 joins with water passing from the space 20 through the openings 80 into that passage before being discharged for subsequent delivery of remaining heat to other components of the breathing system in which the canister is used.

The column 60 is centered axially within the canister device by three legged spiders 90 and 92 that have central openings through which the rod 28 passes. The spider 90 has short legs conveniently soldered or otherwise fixed to the cylinder 62, while the spider 92 has longer legs that rest in notches in the end of the cylinder and bear against the inner surface of the body 12.

A plurality of springs 94, four in number in the embodiment being described, are retained by screws 96 threaded into bosses 98 in the cover member 22 and bear against the perforated disc or screen 50. The springs 94 resiliently urge the disc or screen against the charge of particulate carbon dioxide absorbent when the device is loaded. Loading or filling is accomplished by loosening nut 30, removing the cover 22 and screen 50. The body 12 and the interior of column 60 are then filled with the particulate carbon dioxide absorbent material. The screen 50 is then replaced, the cover 22 secured, and the device placed in service.

The structure being described further comprises a helical member 100 in the form of a lay or inclusion of a strand or rod of metal wire or plastic disposed in the space 20 between the inner and outer walls 14a and 14b. This helical member 100 is arranged so as to define, in the space 20, a helical channel running between the fittings 66 and 68. Accordingly, heated water entering at one of those fittings is divided by the apertures 80, 82 and circulates helically of the body in the water jacket space 20, as well as circulating helically in the tubular conduit 64 of the column 60, before being reunited at the other fitting for discharge.

The resulting structure provides three heated wall surfaces against which the particulate absorbent bed lies. Namely, the inner surface of inner wall 14b, the outer surface of the column 60 and the inner surface of the column 60. These heated surfaces, extending in the direction of flow, convey heat to, or prevent heat loss from, the particulate carbon dioxide absorbent bed and the gas flowing therethrough. Because the gas tends to flow more readily at the boundaries between these wall surfaces and the bed, and is apparently progressively more inhibited in flow at points farther away from those surfaces into the bed, the increased number of along the wall flow surfaces, together with the reduced depth or thickness of absorbent bed between such wall surfaces, a much larger column of the bed is actually transited by the gas, greatly increasing the effective utilization of the absorbent capability of a given charge of bed material. Moreover, the internal column 60 assures more even heating or prevention of heat loss throughout the body 59 of absorbent.

An installation of a canister, constructed and operated according to this invention, in a low flow rate system has shown a 340% increase in duration of effective carbon dioxide removal as compared to the replaced conventional canister.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A scrubber device for removal of carbon dioxide from breathing gas in a closed or semi-closed breathing circuit circuit diving apparatus, said device comprising:

a canister having an elongated, hollow body portion comprising an inner wall defining a chamber for containing particulate, carbon dioxide absorbent material, an outer wall spaced from said inner wall so as to define a heating water jacket space around said inner wall;

first and second canister end closure means at opposite ends of said body portion;

gas inlet and outlet ports communicating respectively with opposite ends of said chamber;

a heat exchanger column disposed concentrically in said chamber and comprising a central tube, a helical water-tube heating coil for containing particulate, carbon dioxide absorbent material having its turns distributed along and fixed to a surface of said central tube and having water inlet and outlet connections for connection to water supply and drain means;

said water inlet and outlet connections being characterized by orifice means communicating with said water jacket space, whereby a portion of heated water entering said inlet connection is passed into said water jacket space and the remainder is passed through said heating coil, whereby the inner surface of said inner wall is heated and the inner and outer surfaces of said central tube are heated so as to heat gas flowing along those surfaces and through interstices of said absorbent material.

2. A scrubber device as defined in claim 1, and wherein said water inlet and outlet connections each comprise:

a tubular member extending through said inner and outer walls of said body portion so as to span said water jacket space therebetween;

said tubular member being engageable at its outer end with a water conduit of said apparatus and being engaged at its inner end with an end of said heating coil; and said tubular member having first orifice means communicating with said water jacket space and second orifice means communicating with said heating coil.

* * * * *